United States Patent [19]

Sauer et al.

[11] Patent Number: 5,120,329
[45] Date of Patent: Jun. 9, 1992

[54] INTEGRATED SYSTEM AND METHOD FOR PROVIDING A CONTROLLED ATMOSPHERE IN A FOOD STORAGE FACILITY

[75] Inventors: Richard A. Sauer, Hinsdale, Ill.; Brian R. Wildey, Danville, Calif.; Raymond J. Brian, Lake Oswego, Oreg.; Richard T. Jahr, Danville, Calif.

[73] Assignees: American Air Liquide, New York, N.Y.; Liquid Air Corporation, Walnut Creek, Calif.; E. I. Du Pont de Nemours and Company, Wilmington, Del.

[21] Appl. No.: 684,482

[22] Filed: Apr. 12, 1991

Related U.S. Application Data

[63] Continuation of Ser. No. 413,225, Sep. 27, 1989, abandoned.

[51] Int. Cl.$^5$ .............................................. B01D 53/22
[52] U.S. Cl. ........................................... 55/16; 55/21; 55/68; 426/419
[58] Field of Search .............. 55/16, 20, 21, 68, 158; 426/419

[56] References Cited

U.S. PATENT DOCUMENTS

| | | | |
|---|---|---|---|
| Re. 30,351 | 7/1980 | Hoehn et al. | 55/16 |
| 3,740,928 | 6/1973 | Schmid | 55/179 |
| 3,822,202 | 7/1974 | Hoehn | 55/16 |
| 4,228,197 | 10/1980 | Means | 55/162 X |
| 4,537,606 | 8/1985 | Itoh et al. | 55/158 |
| 4,566,282 | 1/1986 | Knoblauch et al. | 426/419 X |
| 4,642,996 | 2/1987 | Harris et al. | 426/419 X |
| 4,717,393 | 1/1988 | Hayes | 55/158 X |
| 4,717,394 | 1/1988 | Hayes | 55/158 X |
| 4,740,378 | 4/1988 | Jameson | 426/419 |
| 4,817,391 | 4/1989 | Roe et al. | 426/419 X |
| 4,829,774 | 5/1989 | Wassibauer et al. | 426/419 X |

FOREIGN PATENT DOCUMENTS

| | | | |
|---|---|---|---|
| 0294036 | 12/1988 | European Pat. Off. | 55/16 |
| 0209117 | 4/1984 | German Democratic Rep. | 55/16 |
| 60-137806 | 7/1985 | Japan | 55/16 |
| 63-123418 | 5/1988 | Japan | 55/16 |
| 63-151332 | 6/1988 | Japan | 55/16 |

OTHER PUBLICATIONS

Chemical & Engineering News, "Nitrogen for Blanketing Seen As Growth Area for Gas Separations", pp. 27–29 (Apr. 13, 1989).

Primary Examiner—Robert Spitzer
Attorney, Agent, or Firm—Oblon, Spivak, McClelland, Maier & Neustadt

[57] ABSTRACT

A method for providing a controlled atmosphere in a food storage facility, which comprises:

a) feeding a portion of an atmosphere from a food storage facility, containing carbon dioxide, oxygen and nitrogen, to a feed side of a membrane having a higher permeability to carbon dioxide than to nitrogen, b) recycling the carbon dioxide, oxygen and nitrogen not permeating the membrane back to the storage facility, and venting the carbon dioxide-enriched gas permeating the membrane to the atmosphere, and c) using a membrane-based system to maintain the required atmospheric composition and pressure in the food storage facility.

8 Claims, 2 Drawing Sheets

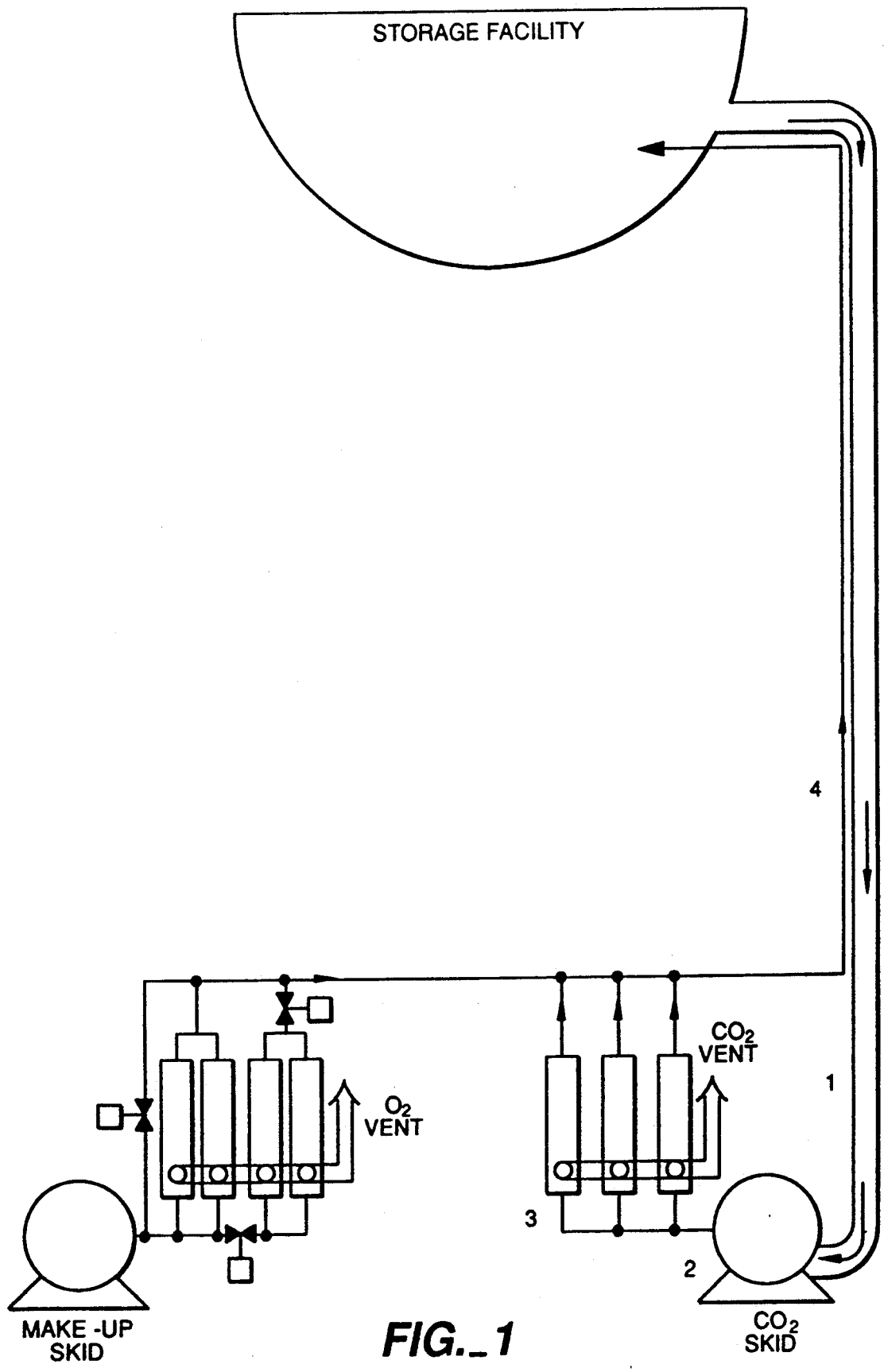
FIG._1

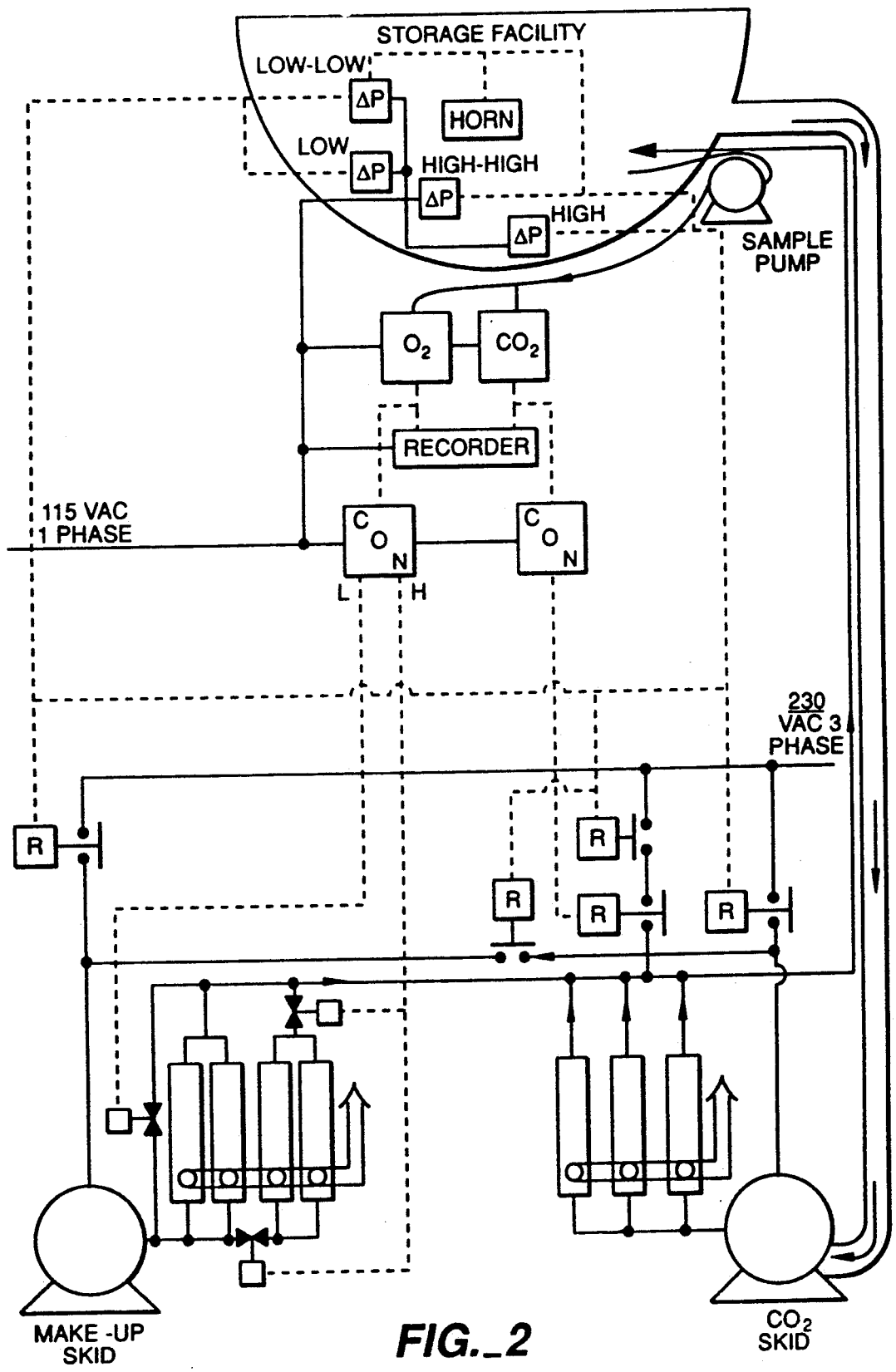
FIG._2

INTEGRATED SYSTEM AND METHOD FOR PROVIDING A CONTROLLED ATMOSPHERE IN A FOOD STORAGE FACILITY

This application is a continuation of application Ser. No. 413,225, filed on Sep. 27, 1989, now abandoned.

BACKGROUND OF THE INVENTION

1. Field of the Invention

The present invention relates to an integrated system and method for providing a controlled atmosphere in a food storage facility.

2. Description of the Background

In the food industry, produce is stored under controlled atmospheric conditions of temperature, gas composition and humidity in order to greatly extend storage life and quality. Typically, the atmosphere in a storage facility is controlled by purging with an inert gas or by scrubbing with a physical or chemical means in order to maintain carbon dioxide and oxygen concentrations within acceptable ranges.

At present, nitrogen gas used for purging the storage facility atmosphere is provided by on-site nitrogen generation systems or by vaporized cryogenically produced nitrogen gas. However, more recently, nitrogen generation from compressed air has been effected using membranes or pressure swing absorption (PSA) technology.

Despite the recent application of these technologies to the generation of nitrogen for controlled atmosphere storage, it would be extremely desirable to be able to maintain all of the required atmospheric controlled conditions with a single system without the addition of an external purge gas.

SUMMARY OF THE INVENTION

Accordingly, it is an object of the present invention to provide an integrated system and method for providing a controlled atmosphere in a food storage facility.

It is a further object of the present invention to provide an integrated system or method for providing a controlled atmosphere in a food storage facility, which utilizes membrane system(s) and a control system.

The above objects and others which will become apparent are provided by a method for providing a controlled atmosphere in a food storage facility, which entails:

a) feeding a portion of the atmosphere from a food storage facility, containing carbon dioxide, oxygen and nitrogen, to a feed side of a membrane having a higher permeability to carbon dioxide and oxygen than to nitrogen, b) recycling the carbon dioxide, oxygen and nitrogen not permeating said membrane back to the storage facility, and venting the carbon dioxide-enriched gas permeating the membrane to the atmosphere, and c) using a membrane-based system to maintain the required atmospheric composition and pressure in the food storage facility.

BRIEF DESCRIPTION OF THE DRAWINGS

FIG. 1 is a simple schematic flow diagram for controlling the atmosphere in a food storage facility in accordance with the present invention.

FIG. 2 is a schematic flow diagram for controlling the atmosphere in a food storage facility in accordance with the present invention also illustrating the use of sensors and detectors.

DETAILED DESCRIPTION OF THE PREFERRED EMBODIMENTS

In accordance with the present invention, it has been discovered that the concentrations of carbon dioxide and oxygen in a food storage facility atmosphere can be effectively maintained using membranes in a closed integrated system. Although membranes have been used for the external on-site generation of nitrogen for use as a purge gas and for simple carbon dioxide scrubbing in food storage systems, the present invention entails the use of membranes to separate carbon dioxide from nitrogen using the atmosphere of a food storage facility in an integrated closed system while substantially maintaining the oxygen content.

In essence, the present invention reduces the carbon dioxide level in a food storage facility atmosphere by running the atmosphere through a membrane which is more permeable to carbon dioxide than to nitrogen. The carbon dioxide-enriched gas is vented to the atmosphere while substantially all of the nitrogen and oxygen are recycled to the food storage facility. Simultaneously, a second membrane system is used for the addition of oxygen and nitrogen to maintain the required atmosphere in the food storage facility.

The present invention also provides an integrated system for practicing the above-described method.

The present method and a system for practicing the same will now be described by reference to FIGS. 1 and 2.

In FIG. 1, the atmosphere from a food storage facility, containing carbon dioxide, oxygen and nitrogen, is fed through a conduit (1) to the feed side of separation membrane bundles (3) on a carbon dioxide skid. The atmosphere is compressed (2) and filtered prior to being fed to the membrane bundles. Semi-permeable gas membranes are used which are preferably made of bundles of thin hollow fibers inserted into a pressure vessel.

In accordance with the present invention, any membrane may be used which allows the preferential permeation of carbon dioxide or carbon dioxide and oxygen through the membrane fibers. Such membranes generally allow greater than about 50% of the carbon dioxide present to permeate through the membrane fiber. It is even more preferred to use membranes which allow greater than about 90% of the carbon dioxide present to permeate through the membrane, while substantially minimizing the loss of oxygen and nitrogen through the membrane so that the non-permeated gas mixture can be recycled. Examples of such membranes which are more permeable to carbon dioxide and oxygen than to nitrogen are polyimide, polysulfone, silicone rubber, natural rubber, butyl rubber, low density polyethylene, polycarbonate, poly(phenylene) oxide, nylon-6,6, polystyrene and cellulose acetate. See Encyclopedia of Chemical Technology, vol. 15, page 118 (Kirk-Othmer).

In the system of FIG. 1, the system is sized such that the carbon dioxide removal capacity is greater than the expected carbon dioxide generation rate from the fruit. The oxygen, nitrogen and the remaining carbon dioxide exit the feed channel of the membrane at high pressure and are recycled back to the storage facility through conduit (4). The carbon dioxide content of the facility can be controlled at a given level using this technique.

FIG. 1 also illustrates the use of a second membrane system known as a make-up skid, which is used to produce an atmosphere of the proper composition to balance the pressure and to maintain the oxygen and nitrogen concentrations in an airtight facility. The make-up air stream, which is used to replace the oxygen and nitrogen consumed by the food stored in the storage facility or lost in the separation process, may be mixed with the recycle stream from the carbon dioxide skid and reinjected into the storage facility. The design of the make-up skid is similar to that of the carbon dioxide removal skid.

The carbon dioxide content, oxygen content and storage facility pressure are maintained by controlling the operation of the carbon dioxide skid and make-up skid. This may be seen by reference to FIG. 2, wherein a sample pump, carbon dioxide and oxygen analyzers, carbon dioxide and oxygen controllers and pressure switches or similar apparati are used to effect the operation of the system.

The carbon dioxide skid and make-up skid are conveniently cycled on and off depending upon the carbon dioxide content of the atmosphere relative to the carbon dioxide setpoint. In accordance with the present invention, a level of carbon dioxide greater than the carbon dioxide setpoint will result in both skids being turned on to remove carbon dioxide and make-up oxygen and nitrogen. By contrast, a carbon dioxide level which is less than the carbon dioxide setpoint will result in both skids being shut off.

The oxygen content is also measured and a controller affects the performance of the make-up skid based upon the oxygen level relative to the oxygen setpoint. If the oxygen content of the facility is low, a bypass around the membranes opens up to increase the concentration of the make-up atmosphere. When the oxygen content is high, additional membranes are brought on line to decrease the atmosphere oxygen concentration. In this manner, both carbon dioxide and oxygen levels are continuously driven towards their respective setpoints.

The storage facility pressure relative to the outside atmosphere is sensed by one or more differential pressure switches which are used to effect the operation of the skids. As an example of pressure differential settings which may be typically used in a food storage facility, the following may be noted. However, these examplary values are provided solely for purpose of illustration and are not intended to be limitative.

If the differential pressure is low, for example, such as less than $-0.25''$ W.C., or low-low, for example, such as less than $-0.5''$ W.C., the switch activates the make-up skid and shuts down the carbon dioxide skid in order to elevate the building pressure. When the differential pressure is high, for example, such as greater than $0.25''$ W.C., or high-high, for example, such as greater than $0.5''$ W.C., the carbon dioxide skid is activated and the make-up skid is shut down to lower the facility pressure. However, the important point is that as long as the differential pressure of the storage facility is within the acceptable range of $-0.25$ to $+0.25''$ W.C., the control of the skids will be based on the carbon dioxide and oxygen concentrations. Thus, within this acceptable pressure range, both skids will operate automatically depending upon the carbon dioxide and oxygen levels relative to the respective setpoints.

The membrane system is designed to maintain the nitrogen, oxygen and carbon dioxide concentrations in a storage facility atmosphere. However, it is also possible, in accordance with the present invention, to use the carbon dioxide removal system in conjunction with a nitrogen and/or air injection system in place of the make-up skid to control oxygen, carbon dioxide and nitrogen concentrations as well as building pressure.

Furthermore, in accordance with the present invention, conventional analyzers and sensors are used in order to ascertain when the system has reached optimal concentrations or setpoints of carbon dioxide and oxygen. Generally, it is desirable if the oxygen content is maintained at from about 1 to 21%, and the carbon dioxide content at about 0 to 20%. It is known, for example, for the preservation of apples that concentrations of about 1 to 3% oxygen and about 1 to 5% carbon dioxide are most preferred. Preferred values for many different types of fruits and vegetables are known to those skilled in the art. Moreover, one skilled in the art may experimentally ascertain the expected carbon dioxide generation rate from fruit, for example, in order to ascertain what carbon dioxide removal capacity is needed.

Finally, in accordance with the present invention, any polymeric membrane may be used provided that it is capable of permeating carbon dioxide at a greater rate than oxygen which in turn is greater than the rate of permeability of nitrogen. For example, polyimide polymer membranes may be used, particularly those in accordance with U.S. Pat. Nos. 3,657,632; 3,822,202; Re 30,351; 4,113,628; 4,705,540; 4,717,393; 4,717,393 and 4,717,394, all of which patents are incorporated herein in the entirety.

The present process for controlling the atmosphere of a food storage facility may be further understood and illustrated by reference to the following Table of events and the corresponding responses presented as a process control hierarchy with the attendant priorities.

| PROCESS CONTROL HIERARCHY FOR ATMOSPHERE CONTROL SYSTEM | | |
|---|---|---|
| PRIORITY | EVENT | RESPONSE |
| 1 | Critically High Building Pressure | Exhaust air through mechanical vent. |
| 1 | Critically High Building Vacuum | Intake air through mechanical vent. |
| 2 | High-High Building Pressure ($\Delta P > 0.5''$ W.C.) | High-High pressure switch activates to turn on $CO_2$ skid & shut off make-up; activate panel lite & horn. |
| 2 | Low-Low Building Pressure ($\Delta P < -0.5''$ W.C.) | Low-Low pressure switch activates to turn on make-up skid & shut off $CO_2$ skid; activate panel lite & horn. |
| 3 | High Building Pressure ($\Delta P > 0.25''$ W.C.) | High pressure switch activates to turn on $CO_2$ skid & shut off make-up skid. |
| 3 | Low Building Pressure ($\Delta P < -0.25''$ W.C.) | Low Pressure switch activates to turn on make-up skid & shut off $CO_2$ skid. |
| | If #3 is satisfied: | |
| 4 | High $CO_2$ Concentration ($CO_2 > 2\%$) | Turn on $CO_2$ & make-up skids. |
| 4 | Low $CO_2$ Concentration ($CO_2 < 2\%$) | Shut off $CO_2$ & make-up skids. |
| | If #4 is satisfied: | |
| 5 | Low $O_2$ Concentration ($O_2 < 0.9\%$) | Open make-up by pass. |
| 5 | High $O_2$ Concentration ($O_2 > 1.1\%$) | Activate Additional membrane modules on make-up skid. |

The specific pressure levels recited above are the levels which may be typically used in a food storage facility. However, other pressure values and ranges may be used depending upon the specific requirements of the food storage facility. Thus, the pressure levels recited herein are not required for operation of the present invention but only act as typical control set points.

The above description is related to steady state operation of the membrane system while fruit is being stored. Pull down of the oxygen during start up of the facility can also be achieved using the membrane system and manifolding both compressors and feeding air to all of the modules to produce the greatest quantity of nitrogen-enriched air. This stream is returned to the storage facility as a purge stream to remove the bulk of the oxygen. The final adjustment of oxygen concentration in the facility can be achieved using vaporized liquid nitrogen or any other convenient source of inert gas.

Membranes have been conventionally used to scrub carbon dioxide from air. However, the present invention is far more than merely a membrane system to separate carbon dioxide. Rather, the present invention provides an integrated system for maintaining a controlled atmosphere in a food storage facility using membrane system(s) and a control system.

Finally, the terminology "W.C." used above, refers to the inches of water in a column as a unit of pressure and is a standard unit of pressure.

Having described the present invention, it will be apparent to one skilled in the art that many changes and modifications can be made to the above, while remaining within the spirit and scope of the present invention.

What is claimed as new and desired to be secured by Letters Patent of the United States is:

1. An integrated method for providing a controlled atmosphere in a food storage facility by automatically and simultaneously maintaining predetermined concentrations of component gas species carbon dioxide oxygen and nitrogen and total gas pressure in the facility relative to the atmosphere, by removing carbon dioxide by enriching and venting in a first stage membrane and by generating an appropriate quantity and composition in a second stage membrane, which process comprises:
    a) feeding a portion of the atmosphere from a food storage facility, said facility having carbon dioxide, oxygen and differential pressure sensors, said atmosphere containing carbon dioxide, oxygen and nitrogen, to a feed side of a semi-permeable gas membrane on a first carbon dioxide removal skid to remove carbon dioxide and to recycle oxygen and nitrogen, said membrane having higher permeability to carbon dioxide than to nitrogen, and being fluidly connected to a second skid, said second skid taking air and making a nitrogen and oxygen stream whose flow and composition when added to a recycle stream from the carbon dioxide removal skid maintains total gas pressure and concentrations of each of carbon dioxide, oxygen and nitrogen in the storage facility, each skid having one or more differential pressure sensors, said carbon dioxide skid and said make-up skid being activated to remove the majority of the carbon dioxide when the level of carbon dioxide in the storage facility is above a predetermined first carbon dioxide set point, and both of said skids being inactivated when the level of carbon dioxide in the storage facility is below a predetermined second carbon dioxide set point, said second carbon dioxide set point being lower than said first carbon dioxide set point, and wherein the carbon dioxide skid and the make-up skid are capable of being automatically and independently operated;
    b) recycling the carbon dioxide, oxygen and nitrogen not permeating the membrane of the carbon dioxide skid to the storage facility and venting the carbon dioxide gas permeating the membrane to the atmosphere; and
    c) adding the oxygen and nitrogen through said second skid as needed to maintain the concentrations of each gas species and total gas pressure in the storage facility atmosphere.

2. The method according to claim 1, wherein said membrane further has a higher permeability to oxygen than to nitrogen.

3. The method according to claim 1, which further comprises a second membrane parallel to said semi-permeable gas membrane having a greater permeability to carbon dioxide than nitrogen, said second membrane system having a higher permeability to oxygen than to nitrogen.

4. The method according to claim 3, wherein said second membrane parallel to said semi-permeable gas is a membrane selected from the group consisting of polyimide, polysulfone, silicone rubber, natural rubber, butyl rubber, low density polyethylene, polycarbonate, poly(phenylene) oxide, nylon-6,6, polystyrene and cellulose acetate.

5. The method according to claim 1, wherein said semi-permeable gas membrane having a greater permeability to carbon dioxide than to nitrogen has a permeability for carbon dioxide such that greater than about 90% of the carbon dioxide present permeates the membrane, while substantially minimizing loss of oxygen and nitrogen through the membrane so that the non-permeated gas mixtures can be recycled.

6. The method according to claim 1, wherein said semi-permeable gas membrane is a membrane selected from the group consisting of polyimide, polysulfone, silicone rubber, natural rubber, butyl rubber, low density polyethylene, polycarbonate, poly(phenylene) oxide, nylon-6,6, polystyrene and cellulose acetate.

7. The method according to claim 1, wherein the storage facility is maintained within a differential pressure range of −0.25 to +0.25" W.C.

8. The method according to claim 1, wherein said second skid operates by a semi-permeable gas membrane or other means able to generate oxygen and nitrogen.

* * * * *